June 10, 1941.　　　　H. ROBINSON　　　　2,245,012
MEAT AND VEGETABLE CHOPPER AND MIXER
Filed May 13, 1939　　　7 Sheets-Sheet 1

Inventor,
Henry Robinson,
By
Attorney.

June 10, 1941. H. ROBINSON 2,245,012
MEAT AND VEGETABLE CHOPPER AND MIXER
Filed May 13, 1939 7 Sheets-Sheet 3

Inventor,
HENRY ROBINSON,
Attorney.

June 10, 1941.  H. ROBINSON  2,245,012
MEAT AND VEGETABLE CHOPPER AND MIXER
Filed May 13, 1939    7 Sheets-Sheet 4

Inventor,
HENRY ROBINSON,
By
Attorney.

Patented June 10, 1941

2,245,012

UNITED STATES PATENT OFFICE 2,245,012

MEAT AND VEGETABLE CHOPPER AND MIXER

Henry Robinson, Lindenhurst, N. Y.

Application May 13, 1939, Serial No. 273,536

33 Claims. (Cl. 146—67)

This invention relates to a machine designed to cut or chop and/or mix various materials but more especially meat, fish, vegetables and other food materials, for example, in the making of sausage, puddings, salads, Hamburg steak and hash.

A general aim is to provide such a machine capable of operation by an electric motor and so constructed, balanced and arranged with respect to the cutting means and associated parts as to attain maximum compactness and enable disposition and operation in minimum space, and wherein the operating parts are especially adapted to be fastened on the machine table and are a novel and superior combination or organization operative at materially less power than if driven directly from a motor drive shaft, as is common in machines of the present general character.

It is a prime desideratum to provide a machine of the character described which is immeasurably safer, especially in cleaning after operation, since there is no possibility of the knives being set in motion when exposed or positioned outside of the bowl or of turning of the gearing.

Another aim is to produce such a machine as may be built of smaller size, with the parts more durable and operating more efficiently and cheaper than in existing structures.

Further aims or objects are to provide in such a machine a novel and superior cutter head and mounting therefor, power transmission, cutting means which eliminates danger of metal particles from fractured knives entering the contents of the bowl upon striking a bone or other hard substance, guard means, revolving bowl, and holding and detachable fastening means for the bowl.

Another prime consideration is to produce such a machine which operates at a speed reduced from the motor speed through an intermediate worm drive, as it enables a motor of considerably less horsepower and consequently much less expensive to be employed, eliminates excessive cutting speed, equalizes the application of stress on the cutting knives and shaft bearings and attains economy and simplicity in construction. The advantages over a machine having direct connection of the motor to the knife shaft are manifold, for instance, avoiding waste of electric current, as the machine, for example, will operate on approximately one-third of the current now required, operate at a more reasonable speed and with less jar and noise.

Another object is to provide novel and superior means and mechanism, greatly conducing toward safety, operable by a single member for cutting off the power, raising a guard and then raising a cutter head, synchronized and timed in succession, and also while the cutter head and cutting means are in lowered position, is operable to clamp such cutter head and to lower the cover and apply the power, synchronized and timed in succession.

Again, an object is to provide a bowl which may be readily removed and is light in weight to facilitate carrying from place to place thus avoiding the necessity of intermediate loading and unloading of food or other material as from a stationary or heavy bowl, and to equip such bowl with a novel peripheral edge portion functioning dually as a rack or gearing and as a hand-grip or handle, with the fingers of the operator engageable in the meshes thereof, such meshes being disposed to facilitate falling of food particles therefrom by downward inclination and centrifugal force as the bowl revolves.

A further object is to produce a machine in which the drive of the cutter head is controlled by gears which will be held stationary with respect to their axes of rotation when operation of the machine is stopped so that the gears may be disengaged and reengaged without disalinement or slippage one relative to the other.

A still further object is to provide a cutter head for the knives which raises on a horizontal axis afforded by a drive shaft mounted on the machine table at a right angle to the head and in line with the drive shaft of a motor also supported on the machine table, this feature enabling the cutter head and shaft to be arranged in L-relation and substantially within the marginal confines of and in conformity with the available space of the table top and in balance with the bowl, and the cutters to be driven at proper and less speed than the motor drive shaft.

One more object is to provide such a machine in which the drive head may serve as a power take-off for a grinder, grater, ordinary slicer or any other auxiliary apparatus or purpose, and in which machine further modification may be made to include novel clutch means in the cutter head to enable selective operation of the cutting means and the auxiliary apparatus.

The more specific objects and advantages will become apparent from a consideration of the description following taken in connection with accompanying drawings, illustrating operative embodiments by way of example.

In said drawings—

Referring specifically to the drawings, wherein like reference characters designate like or similar parts, a table, plate or support for the working parts is shown at 25, preferably being of a metallic casting. Such table is shown attached to a conventional pedestal 26 as by means of removable bolts 27. Obviously, such table can be mounted on any equivalent support.

A bowl B is adapted for rotation about a vertical axis and is supported on the table. One or more knives or equivalent cutting means K operate in the bowl to cut, chop or mix the desired materials, such as meat, fish and vegetables. Such knives are rotatable and operated as parts of a cutter head generally designated C and, in turn, driven from an electric motor M and drive shaft means D. A guard E is adapted to be arranged over the bowl B and to house the knives K.

Said motor M is fastened to the table 25 adjacent one corner of the latter. Said drive shaft means D consists of a shaft 28 disposed in line with the motor drive shaft 29 and is detachably coupled thereto by suitable coupling sections 30 employing screws 31. A housing 22 is disposed over the coupling 30, being screwed at 33 to the table 25. A bracket 34 screwed to the table as at 35 journals the outer end of the shaft 28. Spaced apart hubs 36 and 37 are journaled on shaft 28 and a worm 39 forming a part of said drive shaft 28 has one end 40 in abutment with the hub 37 and a thrust roller bearing 41 is interposed between the other end and the hub 36 as the machine is operative in one direction of rotation only.

Figure 2:
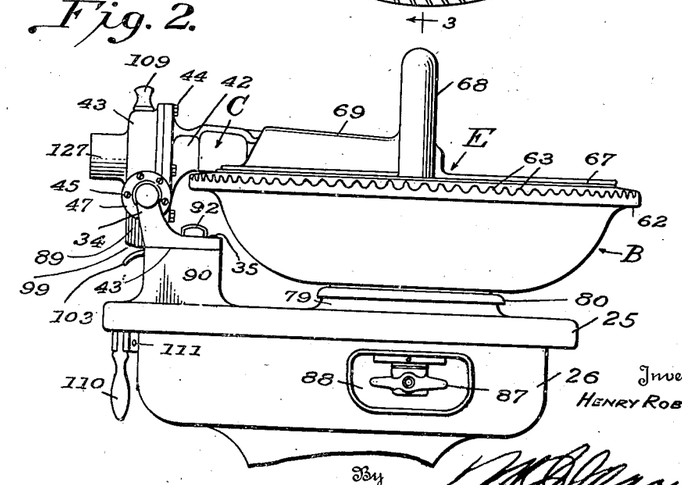
Figure 2 is a view of the machine in side elevation, the pedestal being broken away.

Said hubs or bearings 36 and 37 form parts of the cutter head C. Such head C has an arm or lever 42 extending across the bowl B and at its outer end having a box or housing 43 detachably bolted thereto as at 44. Such housing 43 and the adjacent end of the lever or arm 42 are collectively formed to fit and surround adjacent portions of the hubs or bearings 36 and 37, to which are rigidly joined by means of screws 45 passing through flanges 46 and 47 of such hubs and into the lever 42 and housing 43. Such hubs 36 and 37 mount the cutter head C for movement on the axis of the shaft 29, specifically to and from the positions of Figures 2 and 5.

Journaled longitudinally of the lever 42 and housing 43 of the cutter head is a rotatable shaft 48 provided with a worm wheel 49. Such worm wheel is enclosed by housing 43 and adjacent end of lever 42 and it is enmeshed with the aforesaid worm.

The inner end of the shaft 48 is reduced at a portion 51 and the latter has bearing engagement in a roller bearing structure 52 located in a recess 53 in the inner end of lever 42. A pair of the knives K are removably strung on the reduced shaft portion 51, separated by a removable washer 54 and having removable washers 55 respectively abutting their other sides. A nut 56 is screw-threaded on portion 51 and operable to hold the washers and knives in place without wobbling, but insufficient to bind them together. A shearing pin 57 occupies enlargements 58a in the bores of the knives K and a notch 58 along the bore of adjacent washer 54 as well as a longitudinal groove 58b in the periphery of shaft portion 51 while a similar shearing pin 58' occupies enlargements 58c in the bores of the knives K and a notch 58d in the bores of adjacent disk 54 as well as a long groove 58e in the periphery of shaft portion 51. The knives are made of much harder metal or steel than the shearing pins and the shearing pins are of a predetermined strength whereby they normally key the knives to the shaft portion 51, but will shear along the junction of the bore of the knife and periphery of portion 51 if the knives strike an undue resistance or obstruction such as a bone of greater than predetermined resistance, so that the knives will not fracture or chip, but instead the pin or pins 57 and 58' involved will shear, whereby the shaft 48 will continue to rotate, but the knives will remain idle. The shearing pins 57 and 58' are fully enclosed so that sheared fragments cannot drop into the contents of the bowl. Following removal of an obstruction, after shearing of a pin, nut 56 may be removed as well as the knives K, washers 54 and 55 and shearing pin fragments and thereafter replaced with new shearing pins preparatory to further operation.

Lever 42 is recessed in its underside as at 59 to accommodate a pinion 60 which is keyed at 61 to the shaft 48 in the cutter head C and such pinion 60 depends below the lever 42.

At the upper edge portion of the bowl B, which latter is preferably a metallic casting, an outwardly extending rim or flange 62 is provided which constitutes both a hand-grip or a handle and a rack or gear since the upper surface thereof preferably slightly below the top of the bowl is formed with gear teeth 63 with which the teeth of the pinion 60 are enmeshed. Particular attention is called to the fact that the teeth 63 are preferably relatively large, convex across their tops and that the meshes between the teeth are convex at their bottoms. Such teeth and meshes are generally sort of spirally arranged so that they are parallel to the teeth of pinion 60 at the time they are enmeshed therewith as will be best seen in Figure 1. The teeth of the pinion 60 substantially conform in shape to the teeth 63 although radially arranged with respect to the shaft 48. As a result, pinion 60 will rotate the bowl through the rotation of shaft 48, with minimum friction. As a matter of fact, the pinion 60 is preferably made of fiber, Bakelite or other phenolic condensation product to promote noiseless operation. Since said teeth 63 and meshes are relatively large, the flange 62 affords a hand-grip or handle and the fingers of the hand of the operator may grip the meshes between the teeth 63. This is very advantageous since the bowl B is removable and relatively light in weight, for instance, being of an aluminum alloy, to expedite carrying and unloading. A plurality of bowls B may be employed so that when one is removed another can be placed in the machine and the latter operated without waiting to empty another.

Attention is also directed to the fact that the teeth 63 and their meshes incline downwardly and outwardly so that any material accidentally lodging on the same will tend to fall therefrom by gravity and centrifugal force, also aided by the action of pinion 60 and will not move into the bowl because travel is uphill in the meshes and the latter are closed by the wall of the bowl at their inner ends as at 64.

Figures 3, 14, 22:
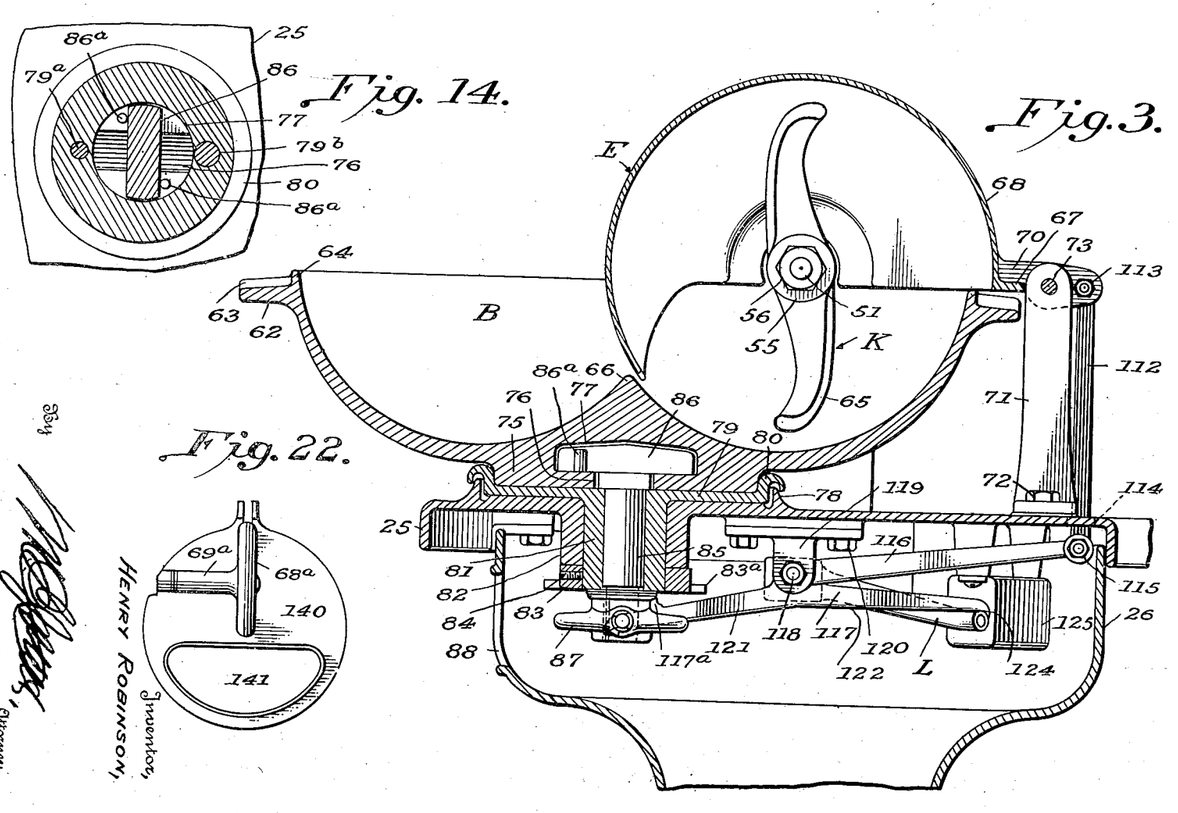
Figure 3 is an enlarged vertical sectional view taken on the plane of line 3—3 of Figure 1, the pedestal being broken away.
Figure 14 is a detail horizontal sectional view showing the detachable connection between the table and bowl, the same being taken substantially on the line 14—14 of Figure 8.
Figure 22 is a plan view of a modified form of guard for the bowl.
Figure 4:
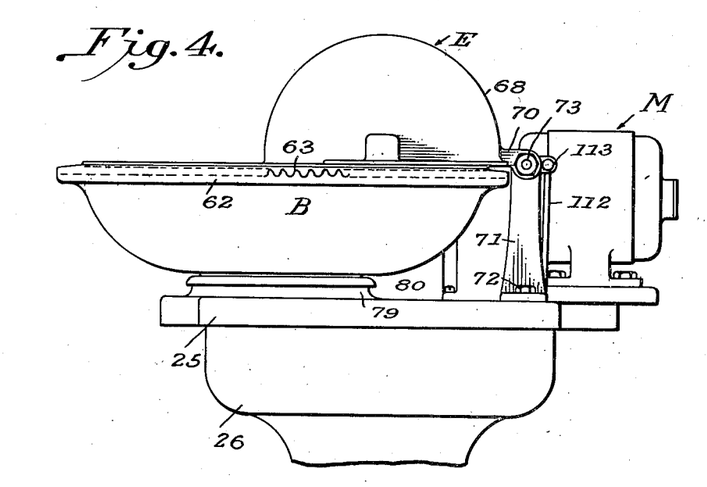
Figure 4 is a view of the machine in elevation taken at 90° to the position of Figure 2.

Said knives K may be of the form best shown in Figure 3, or of any other conventional or preferred form, the cutting edges thereof being arcuate as at 65, to coact with the bowl which has a central raised portion 66 and on all diametric lines from such portion on both sides of the latter is arcuate to the upper edge of the bowl along a curve or arc concentric with that followed by a rotation of the knives, with any desired degree of clearance between the knives and wall of the bowl.

Figure 1:
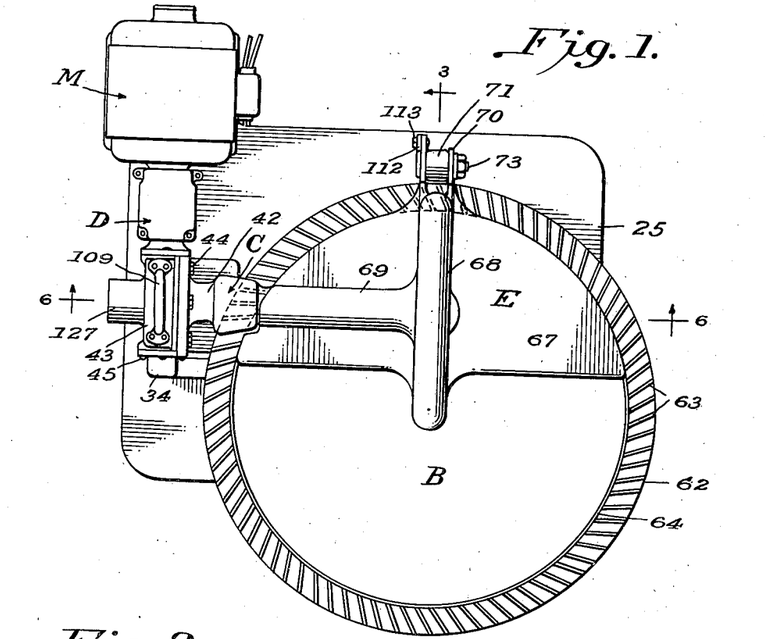
Figure 1 is a plan view of one form of the invention, the parts being shown in operative position.

The guard E is adapted to cover the top of the bowl when the parts are in operation. This guard E may be of any desired size and may fully or partially cover rack teeth 63, if desired. As shown in Figures 1, it is approximately half the size of the space of the bowl and it has an arched portion 68 and an arched portion 69 rising therefrom, adapted to enclose and guard against the operator's hands contacting with the knives K and adjacent parts. It will be realized that the remainder of the bowl is exposed and that the hands may be safely placed therein even during operation of the machine, to remove the cut, chopped or mixed material. Such guard E is provided with lugs 70 disposed on opposite sides of a post or standard 71 rigidly fastened at 72 to the table 25. A bolt 73 passes through lugs 70 and post 71, to pivotally mount such guard E for movement from the closed position of Figures 1, 2 and 6 to the raised or open position of Figure 5.

Figure 5:
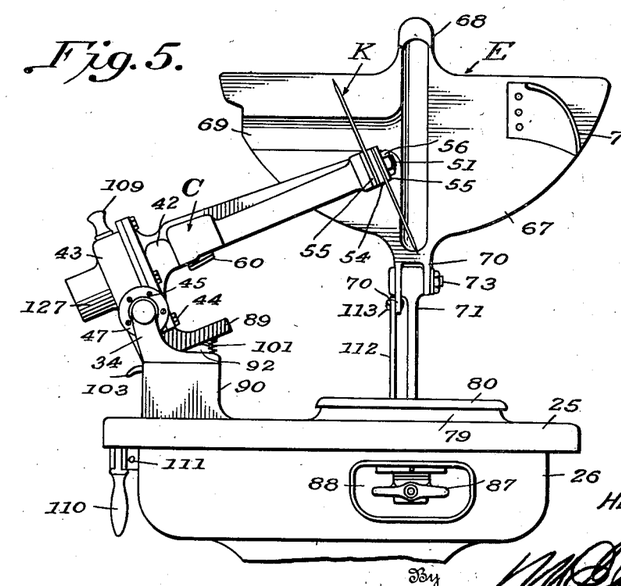
Figure 5 is a view of the machine in side elevation as in Figure 2, but with the cover raised, cutter head raised and the bowl removed.
Figures 6, 15, 16:
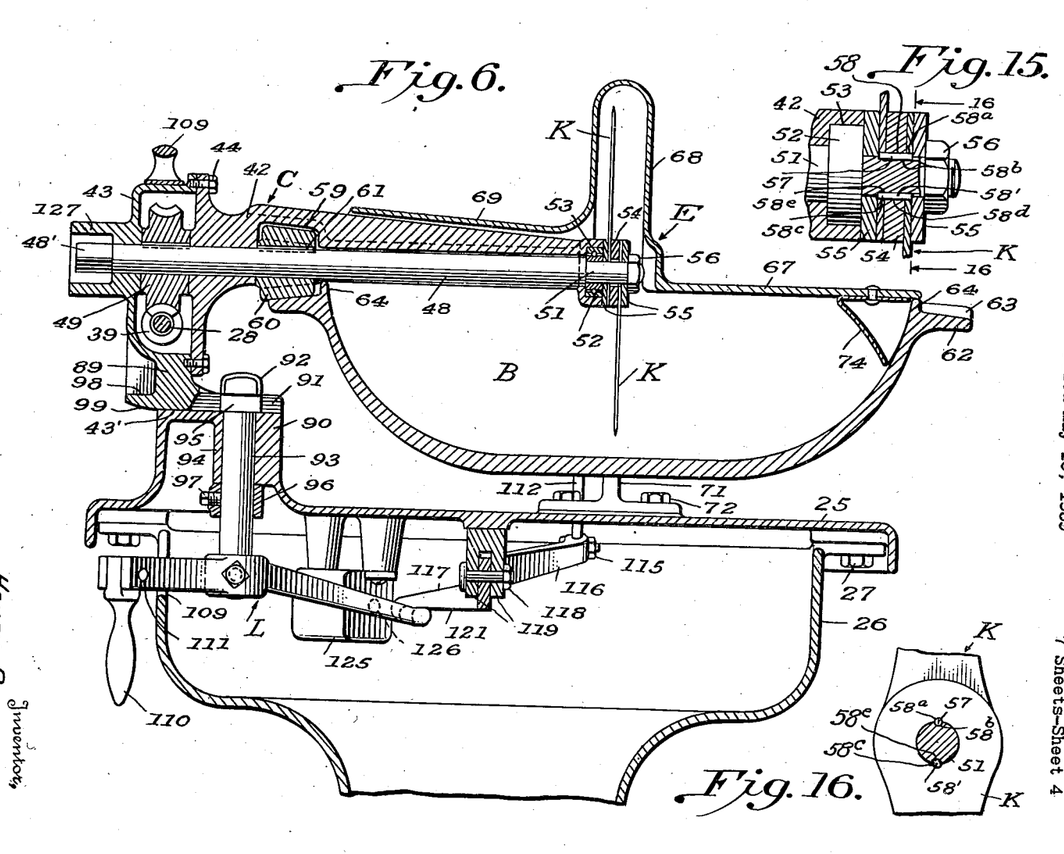
Figure 6 is an enlarged vertical sectional view taken on the plane of line 6—6 of Figure 1.
Figure 15 is an enlarged longitudinal section through the knives and mounting on the same plane as Figure 6.
Figure 16 is a sectional view taken substantially on the line 16—16 of Figure 15.

As shown in Figures 5 and 6, a scraper-deflector 74 is provided on the under surface of guard E to turn and move the material as thrown against the wall of the bowl by centrifugal action inwardly into juxtaposition to the cutters K.

Reverting to the detachable mounting of the bowl, the latter has a depending base 75 whose bottom is flat and has a central rectangular slot 76 leading to an annular recess 77 above the same.

On the table 25, is an annular plate 79 resting on a suitably extended bearing which gives a positioned stability and alinement of the bowl B in combination with its vertical bearing in the table. To this end, table 25 has an upstanding annular rib 78 over which a substantially U-shaped marginal flange 80 on plate 79 extends outwardly. On said plate 79, a pair of lugs 79a and 79b are provided, preferably different in diameter from each other, which occupy recesses 75a and 75b, respectively, in base 75. Depending from plate 79 is a rotatable bearing sleeve 81 which is located within a depending tubular boss 82 on the table 25. Said bearing sleeve 81 extends below boss 82 and the sleeve and plate 79 are held in place by a ring 83 surrounding sleeve 81 and fastened thereto by a screw 84. Plate 79 forms a rotatable support for bowl B.

Figures 8, 9, 10, 11, 12, 13:
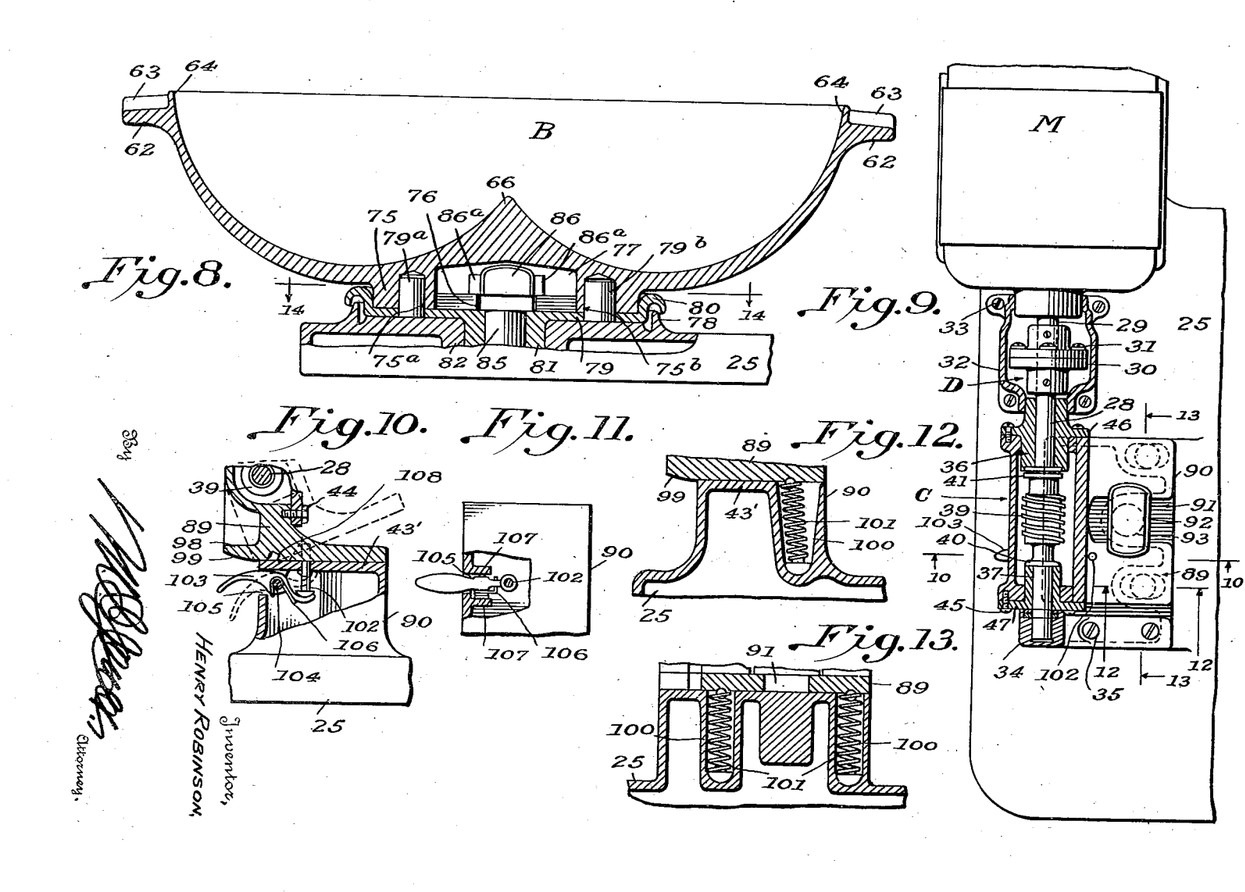
Figure 8 is a vertical sectional view through the bowl and its support, taken at a right angle to Figure 3.
Figure 9 is a view primarily in horizontal section along the drive shaft and its connection to the cutter head.
Figure 10 is a vertical sectional view taken substantially on the plane of line 10—10 of Figure 9.
Figure 11 is a detail view of the riser in plan, partly broken away.
Figure 12 is a detail vertical section taken on the line 12—12 of Figure 9.
Figure 13 is a vertical section taken at a right angle to Figure 12 on the line 13—13 of Figure 9.
Figures 17, 18, 19, 20, 21:
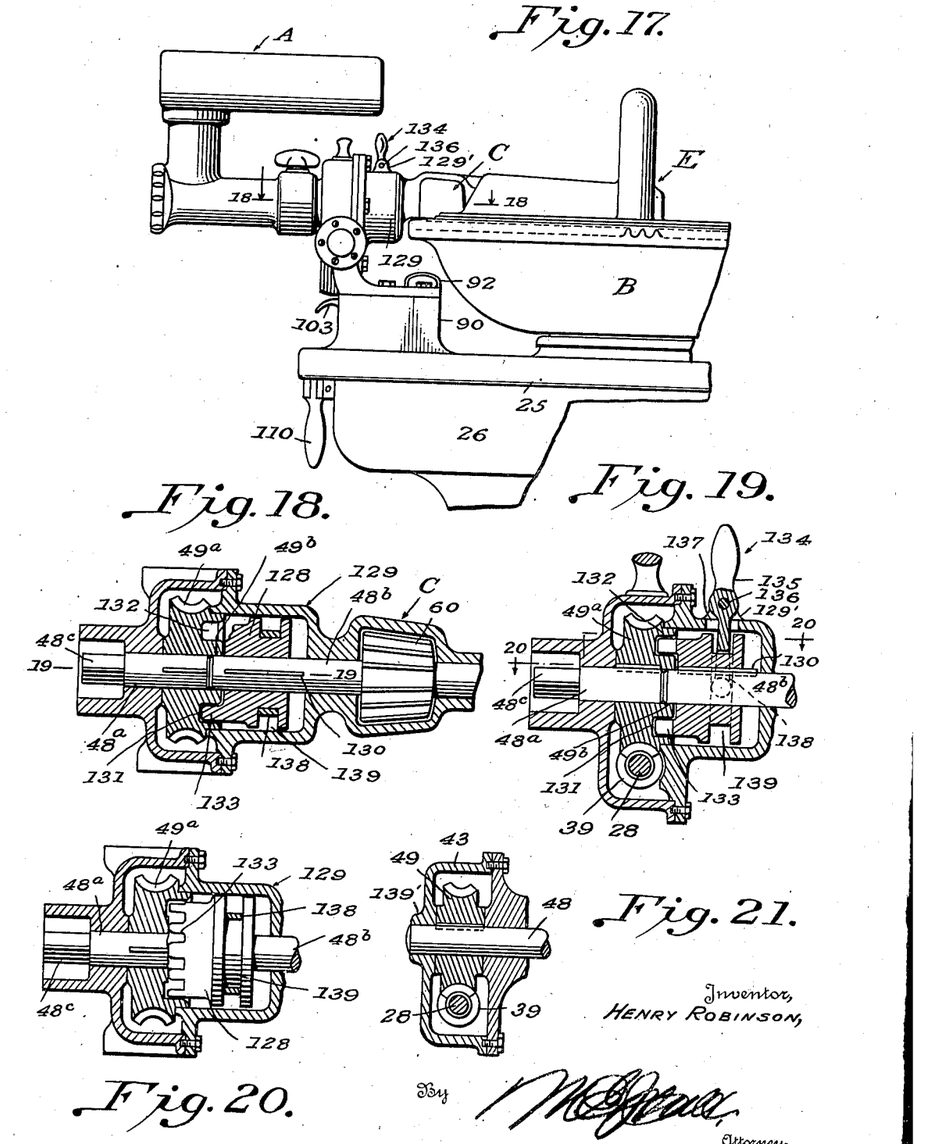
Figure 17 is a side elevation of a modified form of machine, particularly utilizing means for selectively operating the cutting means or an auxiliary device.
Figure 18 is a horizontal sectional view on an enlarged scale taken substantially on the line 18—18 of Figure 17.
Figure 19 is a vertical section taken on the line 19—19 of Figure 18.
Figure 20 is a detail section taken on the line 20—20 of Figure 19.
Figure 21 is a side detail longitudinal section of a further modified form of machine.

A stem 85 is rotatably mounted within the sleeve 81 and has a rectangular head 86 at the top thereof adapted to pass through the slot 76 and then be turned 90° in recess 77 to clamp the bowl in place, correct registration of the bowl relative to clamping head 86 being assured by the engagement of the previously described, different sized pins 79a and 79b and their recesses (Figures 3, 8 and 14). One or more stops 86a limit turning of head 86 to bowl-fastening position. To the lower end of stem 85 an operating handle or the equivalent 87 is detachably fastened, which is accessible through an opening 88 in the pedestal as in Figures 3 and 5. Thus the handle 87 may be turned 90° to aline the latch 86 with slot 76 and the bowl B thereon removed for emptying, filling or the like. Upon the bowl being restored to the rotary support 79, the handle or knob 87 may be turned so as to disaline the latch 86 with the slot 76 and thereby clamp the bowl in place against accidental removal or displacement.

Reverting to the cutter head C, the housing 43 or other suitable part thereof is provided with a foot 89 having a flat lower surface adapted to rest on the crown or flat top 43' of a riser 90 integral with the table 25. Foot 89 is bifurcated or provided with a slot at 91, slightly larger than a latch head 92 which is adapted to aline with the slot 91 so that the cutter head C may be swung or raised on the axis of shaft 29, to the position of Figure 5. Said latch 92 is carried by a rotatable vertical stem 93 which is journaled in a bearing 94 integral with the riser. Said stem 93 is held in place by an enlargement 95 disposed in contact with the top of riser 90 and by a collar 96 secured to the stem below and abutting the bearing 94 as by means of a screw 97.

Said foot 89 has a heel 98 whose under surface is curved at 99 so as to engage the upper surface of riser 90, as shown in Figure 10, to limit the raising or upward movement of the cutter head C to the position of Figure 5.

Said riser has wells 100 cast integral therewith and open at the top, preferably being flared in one dimension as shown, in an upward direction. Disposed in the wells 100 are expansive coil springs 101 which bear against the under surface of the foot 89 and are held compressed thereby so that when the latch 92 is moved into alinement with slot 91, said springs 101 will expand and raise or swing the cutter head C to the position shown in Figure 5 and hold the cutter head C in such position because of the abutment of heel surface 99 with the top of riser 90. Such surface 99 and riser in combination with the springs 101 may be relied on exclusively to hold the cutter head C elevated.

However, I may use a positive means in addition to such surface 99 and springs 101. This positive means may consist of a latch pin 102 slidably mounted for vertical movement in the crown wall of riser 90. Pin 102 is supported by the forward end portion of a lever 103 mounted on a pintle 104 on the riser, the outer end of such lever extending outwardly through an enlarged opening 105 in the side wall of the riser. A coiled expansive spring 106 has one terminal engaged with latch 103 and its other terminal engaged with one of the ears 107 which mounts pintle 104. Spring 106 urges the lever or latch 103 upwardly at its forward end and the pin 102 to its uppermost position. The upper end of such pin engages the undersurface of foot 89 and when a recess 108 in said foot registers with the pin 102, the latter moves upwardly into the same under urgency of spring 106. Pin 102 when engaged with recess 108, rigidly holds the drive head in the elevated position of Figure 5. In order to lower the head C, lever 103 at its handle end, is raised, thereby permitting pin 102 to drop by gravity out of the recess 108, at which time, a handle 109 on housing 43 of the cutter head may be engaged and the cutter head lowered to horizontal position. The upper end of the pin 102 will follow the under surface of the foot 89 so as not to interfere with the operation of the cutter head except when the pin registers with and enters recess 108.

A master operating lever L is substantially horizontally disposed and fastened intermediate its ends rigidly to the lower end of the post 93. At the outer end portion, said lever extends through an enlarged slot 109 in the upper portion of the pedestal. At the outer end of such master lever L, a handle 110 is pivoted at 111 so as to normally depend within the confines of the table 25. When the lever L is swung, handle 110 is raised into alinement therewith to serve as an extension thereof. The turning of said master lever will aline the latch 92 with the slot 91 so that the cutter head may move upwardly under urgency of springs 101 since stem 93 is rotated by the lever L.

The swinging movement of lever L also controls the opening and closing of the guard E. To this end, one of the ears 72 is extended and a link 112 is pivoted thereto as at 113. Said link 112 is substantially vertical and extends through an opening 114 in the table 25 and below the same is pivotally connected at 115 to a crank arm 116 rigid or integral with an arcuate rocker member 117. Said rocker member, by means of a bolt 118 or otherwise, is pivoted on a horizontal axis to a bracket 119 bolted or otherwise fastened at 120 to the under surface of the table 25. The fulcrum of rocker 117 is intermediate its ends and the under surfaces of said rocker as at 121 and 122 are of cam formation, specifically being at slightly downwardly diverging angles meeting in line with the axis 118. Said surfaces 121 and 122 at the outer ends are provided with stops 123 and 124. The inner end of the master lever L moves in a horizontal plane, always in contact with one of the surfaces 121 and 122, thereby causing the rocker 117 to move on its axis as a result of the swinging of the master lever L.

Suitably fastened to the under surface of table 25 is a circuit breaker 125 having a slidable control element 126, normally urged to open circuit position. Such circuit breaker is in the electric circuit to the driving or operating motor M. At one extreme of movement, as shown in Figure 7, a master lever L engages the slide 126, closing the circuit breaker and, accordingly, the circuit through the motor M whereby the latter is energized.

Extending rigidly and laterally from rocker 117 (Figures 7 and 23) is a latch or pawl 117a which raises into engagement and lowers out of engagement with notches 117b between inclined teeth 83a on the periphery of collar 83. Said latch 117a and collar are only engaged after operation of the machine, by the movement of lever 110 to the left in Figure 7. Pawl 117a promptly recedes from such engagement with teeth 84 upon resuming operation of the machine through movement of lever 110 in the opposite direction. When the collar 83 is engaged by said pawl 117a at a notch 117b, the collar, bearing 81 and bowl-carrying plate 79 are latched or locked against rotary movement and are so held to avoid any slippage or accidental rotation of the plate 79 and bowl B, thus insuring enmeshing of the teeth of gear 60 with the teeth 63 whenever gear 60 is lowered. This registration of said teeth 63 and gear 60 is assured by the construction described even if the bowl is removed because the coacting pins 86a and 79a and recesses will not permit other than correct replacement. Teeth 83a, for example, are at a ratio of 4 to 1 to the pitch of the bowl teeth 63. Said teeth 83a and arm 117 at their zones of engagement, are preferably beveled. This feature and inclination of said teeth 83a will insure accurate holding and positioning of the plate 79 and bowl B at all positions in which the machine may be stopped.

Figures 7, 23:
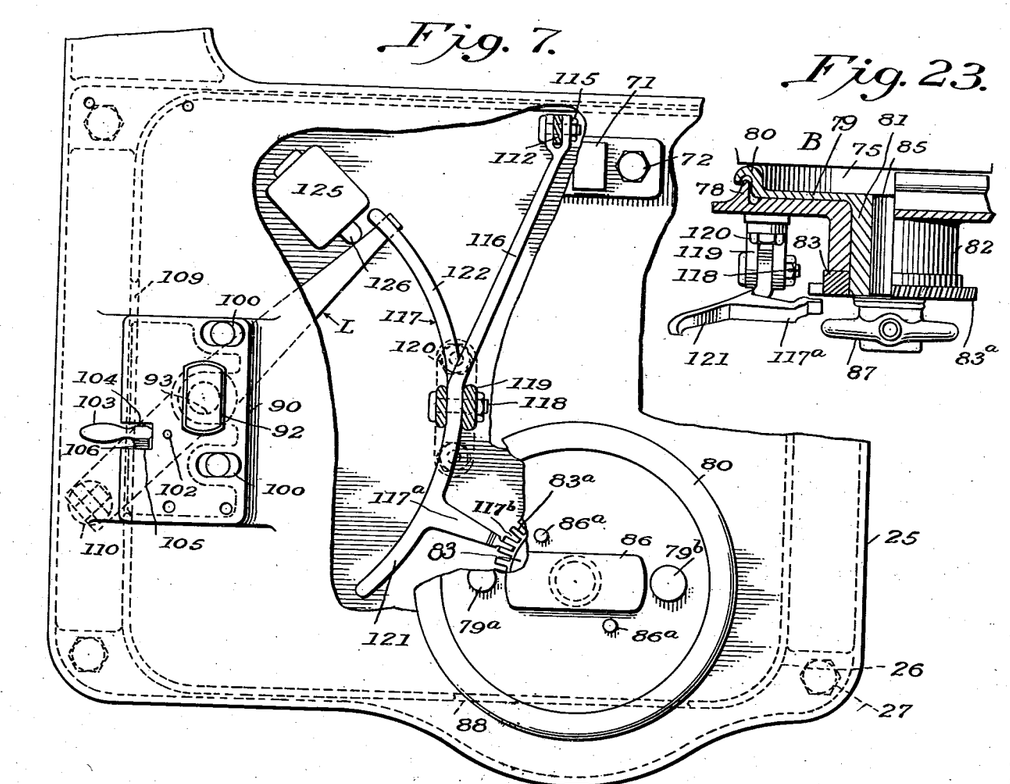
Figure 7 is a view primarily showing the table in plan and broken away to disclose details, all parts supported on the table being removed.
Figure 23 is a fragmentary elevation, partly in section, of the drive and latching control for the bowl.

It is to be noted that in the position of master lever L, as shown in Figure 7, motor M is energized, the cutter head C is in horizontal position latched at 92, and the guard E is lowered or closed. Movement of such lever L at the handle end 110 from right to left in Figure 7, first releases the slide 126 whereby the motor M is deenergized, then through continued travel along the surfaces 121 and 122, rocks member 117 and its crank 116 and through the movement of the latter pulls downwardly on link 112 and associated gear 70, thereby swinging the guard E on the pivot 73 to the raised position of Figure 5, and further movement in the said direction completes rotation of the stem 93 to the extent of 90°. Thereupon, latch 92 alines with slot 91 and springs 101 expand against the foot 89 moving the cutter C to the elevated position of Figure 5. The movement of such head to elevated position is limited by the contact of surface 99 with the crown 43' of the riser 90, and where the pin 102 is employed, the drive head is held in such raised position through the registry of recess 108 with the pin and the movement of the latter into such recess under urgency of lever 103 and spring 106. Near the end of such movement of lever L, the rocker at the pawl 117a raises and moves the latter into the alined notch 117b of collar 83 and thereby locks the bowl-carrying plate 79 and bowl against rotation.

In the aforesaid position, since the guard and cutter head are raised, the bowl B may be removed upon operating handle 87 to aline the latch 86 with the opening 76. All of the operations mentioned, that is the cutting off of the electric motor, the raising of the guard E, raising of the cutter head and locking of the bowl carrying plate 79 are effected through operation of a common means, namely, the single lever L through continued movement in the said direction, specifically, from right to left in Figure 7. Since plate 79 is locked, when the bowl has been replaced, enmeshing of the teeth 63 with those of gear 60 is assured. The parts are operated in the reverse order to that mentioned through the movement of master lever L from left to right in Figure 7, following manual lowering of cutter head C to horizontal position through depression of the handle 109 and raising of handle end of lever 103, if the latter is employed, to lower pawl 117a from engagement with collar 83, move the latch 92 over the foot 89 and later move the rocker 117 so that its crank 116, link 112 and associated parts will lower the guard E.

As shown in Figures 1 to 5 and 6, the cutter head C, as by means of a socket-like extension 127 on housing 43, accommodates the removable attachment and operation of auxiliary devices or mechanism A from the shaft 48 and the latter has a squared or equivalent end 48' located within the extension 127 adapted for connection to the said auxiliary devices A which, for instance, may be ordinary meat or vegetable slicers, coffee grinders, crushers and the like. When such an auxiliary device A is in place, it will be operated simultaneously with the knives K and it is to be realized the machine generally is so built and constructed that this will not impose an undue load on the motor M.

In some instances, I build the machine as in Figures 17 to 20 so that the shaft 48 in the cutter head C will be replaced by alined shaft sections 48a and 48b with a coacting clutch head 128 to enable operation of the auxiliary device without operating the knives K by disconnecting shaft section 48b from shaft section 48a. Shaft section 48a will be continuously driven when the motor M is energized, in the same manner and by the same means as shaft 48 in the form of the invention first described, because the worm wheel 49a in this instance is keyed to shaft section 48a. Said worm wheel at its sides abuts the interior of the adjacent sections of the housing or casing of cutter head C to prevent displacement of shaft section 48a. This form, like in Figures 1, 5 and 6 employs the extension 127 and the outer end of shaft section 48a is squared at 48c for the same purpose as the end portion 48'. The auxiliary device A may thus be removably attached to the extension 127 and driven by the shaft section 48a.

The cutter head C in the present instance, has an enlargement or box 129 on arm 42 which houses and confines movement of the clutch head 128 which is slidable on shaft section 48b for clutch engagement with and disengagement from pinion 49a on shaft section 48a in mesh with worm 39, and interengaged with a spline 130 carried by said shaft section 48b so that the latter and clutch head 128 will unitarily rotate. Pinion 49a has a recess 49b in which the adjacent end of shaft section 48b is journaled and pinion 49a is further recessed in its inner side at 131 and has clutch teeth 132 in the base thereof of less depth than the recess, which are engageable by clutch teeth 133 on the adjacent end of clutch head 128. Said clutch head 128 may be operated in any desired manner as by means of a lever 134, having a handle 135, exteriorly of enlargement 129', the lever being pivoted on a vertical pin 136 to the said enlargement and extending through a horizontally elongated opening 137 in enlargement 129 and terminating in a fork 138 or equivalent operatively engaged in an annular groove 139 of the clutch head 128. When handle 135 is at its left-hand limit in Figure 19, the clutch head 128 at teeth 133 is engaged with teeth 132 and hence shaft section 48a is in gear to operate the auxiliary device A from motor M and also to drive the knives K through shaft section 48b since the clutch head is splined to the latter shaft section. However, when said handle 135 is at its right-hand limit in the last mentioned figure, only the auxiliary device A will be in gear, the knives K being out of gear since shaft section 48b is separate from shaft section 48a and the clutch head at teeth 132 and 133 is disengaged from shaft section 48a.

On the other hand, the machine may be built without any power take-off or means for operating an auxiliary device. Such a machine is fragmentarily suggested in Figure 21. The shaft 48 in this form, is a single length without any clutch arrangement, and the head C has an extended bearing 139' for such shaft.

In Figure 22, a modified form of guard to be optionally employed in lieu of that at E is shown at 140. The latter is of a size to cover the entire space of the bowl B, having arches at 68a and 69a, respectively, for the same purpose as those at 68 and 69. At a location remote to the knives K, this guard 140 has an opening 141 of any desired size to permit access of one or both hands of an operator to the bowl.

To summarize the operation of the machine: The material to be cut, chopped, mixed or otherwise treated or conditioned, may be supplied to or removed from bowl B when the latter is detached from the machine or while it is in place in the machine, as preferred, and even while the bowl is rotating, through the space left exposed by guard E or through the opening 141 in the modified guard 140 of Figure 22, since the hand or hands of the operator will be protected or guarded against injurious contact with the knives by the guard E or 140. The motor M is energized when the handle of master lever L is at the right-hand limit as suggested in Figure 7. In this condition of operation, the cutter head C is in lowered or horizontal position held by the engagement of latch member 92 with foot 89 and guard E is also in lowered or closed horizontal position resting on a stationary part of cutter head C without contact with the rotating knives K and rotating bowl B. The knives will be driven from motor M through shafts 29, shaft 28, worm 39, worm wheel 49 and shaft 48. The latter shaft through the medium of pinion 60 meshing with gear teeth 63 will rotate bowl B. It will be noted that the motor M cannot be operated unless the head C is in lowered and latched position and unless the guard E or 140 is also lowered and the knives and driving means therefor thus fully enclosed and protected in a manner which also guards against accidental contact of any part of the person of the operator therewith.

In order to shut off motor M, the handle 110 of master lever L is moved into alinement therewith and then toward the left. A very limited movement suffices since it is only necessary to disengage the slide 126 which opens the circuit to said motor M. Continued movement of the master lever L in the same direction, that is to the left, will next raise the guard E as previously specifically described, through the coaction of master lever L, rocker 117, crank 116 and link 112. Further movement of master lever L to the left completes a 90° rotation of post 93 which alines or registers latch 92 with slot 91, thereby unlatching or releasing the foot 89 of cutter head C, whereupon the springs 101 expand and swing such cutter head to elevated position as in Figure 5. Elevation of such cutter head is limited by the contact of heel 98 with the crown 43' of riser 90. Where the pin 102 and socket 108 are employed, the pin 102 under urgency of spring 106 and lever 103 will thereupon rise into socket 108 and thus positively hold the drive head C in elevated position. Also when rocker 117 tilts or moves, it raises the pawl 117a into the alined notch 117b. It will be apparent that the same or continued movement of master lever L at its handle end from right to left and in succession, functions to stop motor M, raise guard E, raise cutter head C, and lock the bowl-carrying plate 79 against rotation with sufficient delay between each function to avoid interference in operation of one part with another.

When the guard E and cutter head C are in the said raised position, the bowl B is fully exposed with ample clearance for its removal or replacement. Such bowl may be readily lifted from the machine after alining latch 86 and slot 76 through turning of the handle 87, and carried to any part of the kitchen, establishment or elsewhere for loading, emptying, cleansing or the like since it has no objectionable projections, is relatively light in weight and its rack flange 62 forms a grip engageable at any location by the hands of the operator whose thumbs may enter the meshes between adjacent rack teeth 63 to enhance the grip.

Upon replacing the bowl B, its recesses 75a and 75b are registered with the lugs 79a and 79b and the bowl lowered into interengagement therewith. Since said lugs and their respective recesses are dissimilar in size, or otherwise, and since the bowl is held by pawl 117a against rotation, the bowl is bound to be replaced in correct position. Following replacing of the bowl, handle 87 is turned to disaline latch 86 and slot 76 whereby the bowl is again clamped in place.

In thereupon closing the machine or resuming operation, the operator manually restores the cutter head C by lowering it to horizontal position through depression at handle 109 but first, depressing the lever 103 and permitting pin 102 to fall out of recess 108 when the positive latch is employed. With cutter head C held at handle 109 in such lowered position, master lever L at its handle end is moved from left to right, lowering pawl 117a out of engagement with collar 84, rotating the post 93 to clamp the drive head C in lowered position through the disalining of latch 92 with shaft 91 and overlapping of the foot 89 by the latch 92. Continuation of such movement of the handle end of master lever L to the left, next lowers the guard E through movement of rocker 117, its crank 116 and link 112. Thus the parts of the machine are restored to closed and protected condition for safe operation by the lowering of the cutter head C followed by a single or continuous movement of master lever L from left to right, functioning, in succession, to latch the drive head in lowered position and to lower the guard E. Through continuation of the same last mentioned movement, master lever L engages and moves the slide 126, thus through the circuit breaker or switch 125—126 closing the circuit through motor M, so that coupled shafts 28 and 29, worm 39, worm wheel 49, shaft 48 and shear pins 57 and 58' will rotate knives K. At the same time, pinion 60 through rack teeth 63 rotates the bowl so that the material aided by deflector 74 will constantly be moved inwardly into juxtaposition to the knives K. It will be remembered that should undue resistance be encountered by the knives K, such as a bone fragment, the shear pins 57 and/or 58' will fracture and the knives K will remain idle and uninjured notwithstanding rotation of shaft 48. The fractured shear pin or pins may be readily removed and new ones substituted as previously specifically described.

What is claimed is:

1. Apparatus of the class described having a removable bowl, a cutter head pivotally mounted to enable raising and lowering with respect to the bowl, a cutter operating shaft on the cutter head, latching means to secure the cutter head in lowered position, a guard associated with the cutter head movable to and from closed position to enable swinging of the cutter head to provide clearance for removal of the bowl, means movable to raise the guard, and positive means for preventing rotation of the cutter operating shaft as a condition precedent to initiation of raising movement of the guard.

2. Apparatus of the class described having a cutter head, means pivoting the cutter head for movement to and from operative and displaced positions, means latching the cutter head in operative position, a guard for the cutter head movable to and from closed position to enable swinging of the cutter head, driving means for the cutter head, and operating mechanism constrained to effect the operations of latching of the cutter head by the second mentioned means, closing of the guard and energization of the driving means in succession, said mechanism including parts interconnected and preventing the said operations independently and out of the order stated to insure safety.

3. Apparatus of the class described having a cutter head, a bowl with which the cutter head coacts, a stationary motor having a driven shaft, means pivoting the cutter head for movement relatively to said shaft to and from operative and displaced positions relative to said bowl, means latching the cutter head in operative position, a guard for the cutter head movable to and from closed position to enable swinging of the cutter head, driving gearing between said shaft and the cutter head, and operating mechanism constrained to effect the operations of stopping said driving gearing, opening of the guard and unlatching of the cutter head by the second mentioned means in succession said mechanism including parts interconnected and preventing the said operations independently and out of the order stated to insure safety.

4. Apparatus of the class described having a cutter head, means pivoting the cutter head for movement to and from operative and displaced positions, means latching the cutter head in operative position, a guard for the cutter head movable to and from closed position to enable swinging of the cutter head, driving means for the cutter head, and operating mechanism having a part manually engageable and movable in a single direction to effect the operations of latching of the cutter head by the second mentioned means, closing of the guard and energization of the driving means in succession, said mechanism including parts interconnected and preventing the said operations independently and out of the order stated to insure safety.

5. Apparatus of the class described having a cutter head, means pivoting the cutter head for movement to and from operative and displaced positions, means latching the cutter head in operative position having a securing head, a rotatable post carrying said securing head, a guard for the cutter head movable to and from closed position to enable swinging of the cutter head, driving means for the cutter head, and operating mechanism including a lever fixed on said post, operable in a single direction to effect latching of the cutter head by the second mentioned means, closing of the guard and energization of the driving means in succession.

6. Apparatus of the class described having a pivoted cutter head, a rotatable post, latch means for the cutter head rotatable with said post, a lever fixed on the post, a guard disposed over the cutter head movable to and from open and closed relation with respect thereto, rocker means operable by said lever, and means to actuate the guard controlled by said rocker means.

7. Apparatus of the class described having a pivoted cutter head, a post, a latch for the cutter head rotatable with said post, a table having a riser in which said post is pivoted, said head having a foot engageable by the latch to secure the same against the riser, a lever rigid on the post, rocker means mounted by said table under control of said lever, a guard disposed over said cutter head movable to and from closed position, and a connection to actuate the guard from said rocker means.

8. Apparatus of the class described having a pivoted cutter head, a pivoted post, latch means for said cutter head rotatable with the post, a guard disposed over said cutter head movable to and from closed position, a movable operating member rotatable with said post, a rocker member having a cam surface traversed by the operating member, and linkage from said rocker member to said guard to actuate the latter.

9. Apparatus of the class described having a pivoted cutter head, latch means therefor, a guard disposed over said cutter head movable to and from closed position, a movable operating member for said latch means, a rocker member under control of said operating member, and a connection from said rocker member to said guard to actuate the latter as the operating member moves the rocker member.

10. Apparatus of the class described having a pivoted cutter head, a post, a latch for the cutter head in rigid relation with the post, a post carrying said latch, a table having a riser in which said post is pivoted, said head having a foot engageable by the latch to secure the same against the riser, a heel on said foot to abut said riser to limit swinging of the cutter head, means urging swing of the cutter head, a lever on which the post is rigid, rocker means mounted by said table under control of said lever, a guard disposed over said cutter head movable to and from closed position, and a connection to actuate the guard from said rocker means.

11. A machine of the class described having a bowl, a substantially horizontal driving shaft, a lever mounted for pivotal movement about the axis of said shaft, a shaft journaled on said lever, gearing on the second mentioned shaft geared to the bowl disengageable through raising of said lever at the bowl end, cutting means on the second shaft operable within the bowl, a gear connection between said shafts to drive one from the other and pivotally mount the lever, and a device releasable through raising of the bowl end of the lever operable to secure the lever against accidental lowering movement.

12. A machine of the class described having a bowl, a driving shaft, a lever, a shaft journaled on said lever, cutting means on the latter shaft operable within the bowl, a gear connection between said shafts to drive one from the other and pivotally mount the lever on a substantially horizontal axis, a support, a latch member mounted on the support to secure the lever in position with the cutting means elevated with respect to the bowl operable through raising of the lever on the said side of its axis as the cutting means, the lever having a recess normally disalined with the latch member and disposed to aline with the latch member through said raising, a second lever on said support, and a spring urging movement of the second lever to project said latch member for engagement in said recess.

13. A machine of the class described having a bowl, a driving shaft, a lever, a shaft journaled on said lever, cutting means on the latter shaft operable within the bowl, gearing between said shafts to drive one from the other and pivotally mount the lever for raising relatively to said bowl, said lever having a housing about said gearing, a foot on said housing, a table having a riser on which the foot is adapted to rest, latch means for the foot mounted by the riser, and means on the riser operable through swinging movement of the lever to latch the same against accidental return from raised position.

14. A machine of the class described having a bowl, a rotatable support, interengaging means on the bowl and support removably mounting said bowl, a cutter head, a shaft on said cutter head extending across the marginal edge of the bowl, cutting means on said shaft operable within the bowl, a drive connection between said shaft and said bowl engaging the latter from above to thereby normally prevent disengagement of said interengaging means, a driving shaft outside of and relatively close to said bowl, and a connection relatively close to the bowl pivotally mounting said cutter head on the axis of said driving shaft gearing the shafts together so that the bowl may be released by the drive connection and the bowl removed.

15. A machine of the class described having a table, a plate journaled thereon, a bowl removably resting on said plate having an interior recess and a slot communicating therewith, said slot being closed at the inner surface of the bowl and open at the bottom wall of the bowl, a stem journaled in and upwardly extending through the plate having a securing head for said bowl insertable through said slot and adapted to be turned into said recess, and means operable to rotate the bowl.

16. A machine of the class described having a bowl, a cutter head extending over the marginal edge of the bowl, a driving shaft means exteriorly of the bowl disposed on a fixed axis intersecting the cutter head, a stationary motor to operate the latter means, a shaft journaled on the cutter head, cutting means on the shaft, means pivotally mounting the cutter head on said shaft means including intermeshed gears to operate the shaft from the shaft means, said shaft including a clutch mounted by and movable with the cutter head and engageable with the side face of one of said intermeshed gears whereby the latter functions dually as a gear and as a clutch member.

17. A machine of the class described having a bowl, a cutter head extending over the marginal edge of the bowl, a driving shaft means exteriorly of the bowl disposed on a fixed axis intersecting the cutter head, a stationary motor to operate the latter means, a shaft journaled on the cutter head, cutting means on the shaft, means pivotally mounting the cutter head on said shaft means including intermeshed gears to operate the shaft from the shaft means, clutch mounted by and movable with the cutter head and engageable with the side face of one of said intermeshed gears whereby said one of the intermediate gears functions dually as a gear and as a clutch member, a housing on said head about said gears, and a power take-off shaft journaled on the housing and driven by the gear adjacent the shaft means.

18. Apparatus according to claim 3 having a spring tensioned by the cutter head when the latter is latched, whereby said spring will raise the cutter head when the latter is unlatched.

19. Apparatus of the class described having a support, a cutter head pivoted on said support, a rotatable post mounted on said support, latch means securing the cutter head rotatable with said post, a lever fixed on the post, a guard disposed over the cutter head movable to and from open and closed position with respect thereto, and mechanism to actuate the guard under control of said lever.

20. A machine of the class described having a support, a bowl journaled thereon, a stationary motor on said support, a driving shaft on said support exteriorly of the bowl driven by said motor, a lever through which said shaft passes movable about the axis of said shaft and extending partly over the bowl, cutting means within the bowl, a shaft to operate the cutting means perpendicularly to the axis of rotation of the bowl journaled on said lever, gearing carried by said shaft geared to the bowl and disengageable from the bowl through swinging movement of the lever, said gearing being approximately enclosed by the lever and adjacent portion of the bowl, and a gear connection between said shafts to drive one from the other enabling swinging movement of the lever.

21. A machine of the class described having a support, a bowl journaled thereon, a stationary motor on said support, a shaft on said support exteriorly of the bowl driven by said motor, spaced bearings for said shaft, a lever through which said shaft passes, said lever being journaled on said bearings in spaced relation to the shaft for swinging movement on said bearings about the axis of said shaft, said lever extending across the bowl, cutting means within the bowl, a shaft to operate the cutting means perpendicularly to the axis of rotation of the bowl journaled on said lever, gearing carried by said shaft geared to the bowl and disengageable from the bowl through swinging movement of the lever, said gearing being approximately enclosed by the lever and adjacent portion of the bowl, and a gear connection between said shafts to drive one from the other enabling swinging movement of the lever.

22. A machine of the class described having a rotatable bowl, a driving shaft exteriorly of the bowl, a lever movable on the axis of said shaft extending over the bowl, a shaft journaled on said lever, cutting means on the latter shaft operable within the bowl, gearing on the second mentioned shaft geared to the bowl releasable through movement of said lever, said gearing being approximately enclosed by the lever and adjacent portion of the bowl, a gear connection between said shafts to drive one from the other and pivotally mount the lever, and an operating member having parts connected thereto and interconnected with each other to control operation of the driving shaft, and said parts including a device to latch said lever through a continuous movement of the operating member.

23. A machine of the class described having a bowl, a support, a plate journaled on said support on which the bowl is removably journaled, interfitting means between said plate and support, a driving shaft on said support exteriorly of the bowl, a lever movable on the axis of said shaft, a shaft extending across the top of the bowl and journaled on said lever, cutting means on the latter shaft operable in a plane perpendicular to the axis of rotation of the bowl and within the latter, gearing between said shafts to drive one from the other and pivotally mount the lever, a gear on the second mentioned shaft geared to the bowl from above to rotate the bowl and plate, said gearing being approximately enclosed by the lever and adjacent portion of the bowl, the latter gear being disengageable from the bowl through pivotal movement of the lever to enable removal of the bowl from the plate.

24. A machine of the class described having a bowl, a support, a plate journaled on said support on which the bowl is removably journaled, interfitting means between said plate and support, a latching means securing the bowl to said plate and extending upwardly through the plate and effective interiorly of the wall of the bowl, a driving shaft on said support exteriorly of the bowl, a lever movable on the axis of said shaft, a shaft extending across the top of the bowl and journaled on said lever, said shaft being located in such proximity to the bowl as to prevent raising of the bowl to disengage said interfitting means, cutting means on the latter shaft operable in a plane perpendicular to the axis of rotation of the bowl and within the latter, gearing between said shafts to drive one from the other and pivotally mount the lever, a gear on the second mentioned shaft geared to the bowl from above to rotate the bowl and plate, the latter gear being disengageable from the bowl through pivotal movement of the lever to enable removal of the bowl from the plate.

25. A machine of the class described having a table, a motor fixed on said table, a plate rotatable on said table, a bowl removably interfitted with said plate, a driving shaft operated by said motor and mounted on said table exteriorly of the bowl, a cutting head disposed non-radially of the bowl and pivotally mounted on said shaft, cutting means on said cutting head operable in a plane perpendicular to the axis of rotation of the bowl, a gear above the bowl carried by said head between its pivotal axis and said cutting means having its teeth disposed longitudinally with respect to the axis of rotation, said gearing being approximately enclosed by the lever and adjacent portion of the bowl, teeth on said bowl non-radial with respect to the bowl and enmeshed with said gear, and gearing carried by said cutter head effective to drive said gear and cutting means from said driving shaft.

26. A machine of the class described having a support, a bowl, a rotatable plate on said support removably interengaged with and journaling said bowl, a rim on said bowl projecting outwardly at the upper edge thereof, teeth on the upper surface of said rim to prevent slippage of an operator's fingers engaged therewith, displaceable means mounted on said support geared to said teeth and operable to rotate the bowl, and means connected to the first means operable through displacing movement of the first means to prevent rotation of said plate relative to the support.

27. A machine of the class described having a table, a plate journaled thereon, a bowl removably disposed on and interengaged with said plate to rotate with the latter, displaceable means to rotate the bowl mounted on said table, and a device interconnected with said displaceable means operable through displacement of the latter to engage and hold the plate against rotation relative to the table.

28. A machine of the class described having a support, a bowl journaled thereon, a motor fixed on said support, a driving shaft on said support driven by the motor, a lever disposed partly across the bowl mounted for pivotal movement about the axis of said shaft, a shaft journaled on said lever, cutting means on the latter shaft operable within the bowl, a gear connection between said shafts to drive one from the other and pivotally mount the lever, gearing on the second mentioned shaft geared to the bowl and approximately enclosed by the lever in combination with the bowl, and spring means operable to swing the lever upwardly to disengage the last mentioned gearing from the bowl, said spring means being positioned for tensioning through the lowering movement of the lever.

29. A machine of the class described having a bowl, a driving shaft exteriorly of the bowl, a lever, a shaft journaled on said lever, cutting means on the latter shaft operable within the bowl, gearing between said shafts to drive one from the other and pivotally mount the lever, said lever having a housing about said gearing, a support, a foot on said housing having a lower surface disposed to rest on said support, and latch means having a rigid part to overlap and secure said foot with said surface against said support, and a heel on said foot having a curved lower surface as a continuation of the first mentioned surface to about said support to limit swinging of the lever.

30. A machine of the class described having a bowl, a support mounting said bowl, a driving shaft exteriorly of the bowl, a lever, a shaft journaled on the lever, cutting means on the latter shaft operable in the bowl, gearing between said shafts to drive one from the other and pivotally mount the lever, a gear on said second shaft, teeth on said bowl enmeshed with said gear, a rocker pivoted on said support, means to raise said lever to disengage the gear and teeth and also to operate the rocker, and means engageable through movement of the rocker to restrain the bowl against rotation relative to said support so as to insure registration of the teeth and gear upon lowering of the lever.

31. A machine of the class described having a bowl, a support mounting said bowl, a driving shaft exteriorly of the bowl, a lever, a shaft journaled on the lever, cutting means on the latter shaft operable in the bowl, gearing between said shafts to drive one from the other and pivotally mount the lever, a gear on said second shaft, teeth on said bowl enmeshed with said gear, a rocker pivoted on said support, means to raise said lever to disengage the gear and teeth and also to operate the rocker, and means engageable through movement of the rocker to restrain the bowl against rotation relative to the said support so as to insure registration of the teeth and gear upon lowering of the lever, said last mentioned means comprising a projection on the rocker, and a part rotatable with the bowl for engagement by the projection.

32. A machine of the class described having a table, a plate journaled thereon, a bowl removably carried by the plate, said bowl having gear teeth about the periphery thereof, a cutter head including gearing enmeshed with said gear teeth, means mounting said cutter head on the table for coaction with the bowl and for movement to demesh said gearing to enable removal of the bowl, interengaging means between the plate and the bowl to cause the bowl to rotate with the plate, a guard disposed about the cutter head, means movably mounting the guard on the table, a connection between the guard and the cutter head, and means operable through said movement of the cutter head to constrain rotation of said plate.

33. Apparatus of the class described having a support, a bowl removably and rotatably mounted thereon, a cutter head pivoted on the support, driving gearing from the cutter head to the bowl constructed and arranged to demesh through said pivotal movement of the cutter head, a guard operatively associated with the cutter head movable to and from closed position to enable swinging of the cutter head, means operable to close the guard including a connection between the guard and cutter head to effect enmeshing of said gearing as a condition precedent to closing of the guard, and means interconnected with said connection functioning through opening movement of the guard to hold the bowl against rotation to facilitate subsequent enmeshing of the gearing.

34. Apparatus of the class described having a cutter head, means pivoting the cutter head for movement to and from operative and displaced positions, means latching the cutter head in operative position, a guard for the cutter head movable to and from closed position to enable swinging of the cutter head, driving means for the cutter head, operating mechanism having an operating member, said operating mechanism being constrained to effect the operations of latching of the cutter head by the second mentioned means, closing of the guard and energization of the driving means in succession through movement of said member in one direction, and through movement of said member in the opposite direction, to effect the operations of deenergizing the driving means, opening the guard and unlatching the cutter head by the second mentioned means, said mechanism including parts interconnected and preventing the said operations independently and out of the order stated to insure safety.

35. Apparatus of the class described having a support, a bowl journaled thereon having gear teeth in a continuous bath, a cutter head, means pivoting the cutter head on said support for movement to and from operative and inoperative positions, means latching the cutter head in operative position, a guard for the cutter head movable to and from closed position to enable swinging of the cutter head, driving means for the cutter head having a gear engageable and disengageable with said gear teeth of the bowl through said swinging of the cutter head, operating mechanism having an operating member, said operating mechanism being constrained to effect the operations of latching of the cutter head by the second mentioned means, closing of the guard and energization of the driving means in succession through movement of said member in one direction, and through movement of said member in the opposite direction, to effect the operations of deenergizing the driving means, opening the guard and unlatching the cutter head by the second mentioned means, said mechanism including parts interconnected and preventing the said operations independently and out of the order stated to insure safety.

36. Apparatus of the class described having a support, a cutter head, means pivoting the cutter head on said support for movement to and from operative and displaced positions, a guard for the cutter head movable to and from closed position to enable swinging of the cutter head, driving means on the support for the cutter head, operating mechanism having an operating member, said operating mechanism being constrained to effect the operations of closing of the guard and energization of the driving means in succession through movement of said member in one direction, and through movement of said member in the opposite direction, to effect the operations of deenergizing the driving means and opening of the guard, to expose the cutter head and permit movement of the latter to said displaced position, said mechanism including parts interconnected and preventing the said operations independently and out of the order stated to insure safety.

37. Apparatus of the class described having a support, a rotatable plate journaled thereon, a bowl removably interengaged with said plate having peripheral gear teeth, a cutter head, means pivoting the cutter head on said support for movement to and from operative and displaced positions, means latching the cutter head in operative position, a guard for the cutter head movable to and from closed position to enable swinging of the cutter head, driving means for the cutter head, operating mechanism having an operating member, said operating mechanism being constrained to effect the operations of releasing said plate for rotation, latching of the cutter head by the second mentioned means, closing of the guard and energization of the driving means in succession through movement of said operating member in one direction, and through movement of the operating member in the opposite direction, to effect the operations of deenergizing the driving means, opening the guard, unlatching the cutter head by the second mentioned means and constrain rotation of said plate, said mechanism including parts interconnected and preventing the said operations independently and out of the order stated to insure safety.

38. Apparatus of the class described having a base, a bowl thereon, a cutter head pivoted for movement to and from a position to operate within the bowl, rotatable cutting means on the cutter head, disconnectible power means to drive the cutting means and rotate said bowl, a guard disposed over the cutting means movable independently of the cutting means, and mechanism operatively mounted on the base to open the guard, said mechanism including means on the base interconnected with a part rotatable with the bowl and operative to positively lock the cutting means against rotation following disconnection of the power means, as a condition precedent to opening movement of the guard.

HENRY ROBINSON.